INVENTORS
KENICHI KITAGAWA, AKIRA KADONO,
RIKICHI HOMURA, MITSUHIRO OHTA

BY *Stevens, Davis, Miller & Mosher*

ATTORNEYS

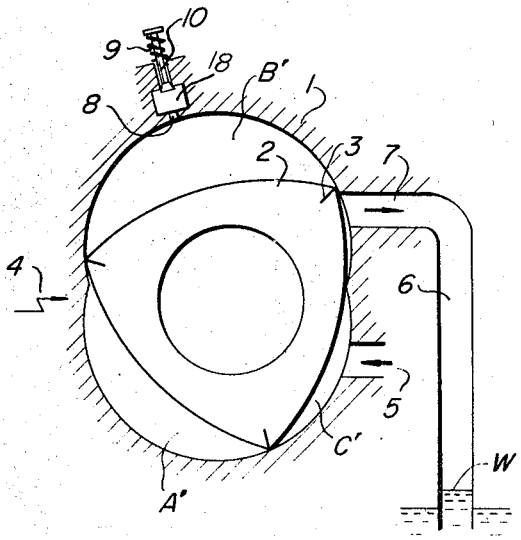
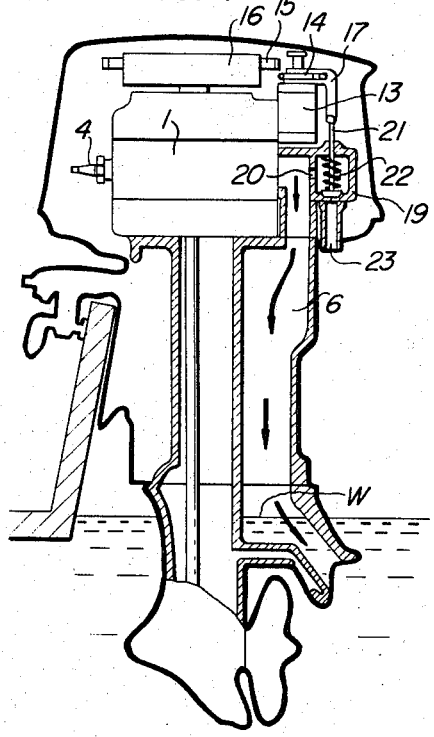

United States Patent Office 3,552,121
Patented Jan. 5, 1971

3,552,121
MEANS FOR PREVENTING REVERSE WATER FLOW THROUGH EXHAUST PIPE OF A ROTARY PISTON TYPE MARINE ENGINE
Kenichi Kitagawa, Shiga-ken, Akira Kadono, Hikone-shi, and Rikichi Homura and Mitsuhiro Ohta, Naga-hama-shi, Japan, assignors to Yanmar Diesel Engine Co., Ltd., Kita-ku, Osaka, Japan, a corporation of Japan
Filed Dec. 4, 1968, Ser. No. 781,185
Claims priority, application Japan, Dec. 25, 1967, 42/83,475
Int. Cl. F01m 1/14; F02b 55/16; B63h 21/26
U.S. Cl. 60—30
2 Claims

ABSTRACT OF THE DISCLOSURE

A reverse water flow arrester for a Wankel type rotary piston engine having an exhaust pipe with one end connected with an exhaust working chamber of the engine and the other end inserted into water for discharging exhaust gas thereinto, said arrester comprising a vacuum valve for relieving negative pressure created during engine start within said engine exhaust working chamber in order to prevent the water taken into the engine due to the negative pressure, and means for interconnecting the vacuum valve with engine starting means to open said valve during engine start.

BACKGROUND OF THE INVENTION

Field of the invention

The present invention relates to a reverse water flow arrester for a rotary piston type marine engine adapted to be equipped in an outboard engine or the like in which exhaust gas is discharged into water, said arrester being effective to prevent the water from being taken into an engine working chamber through the exhaust pipe associated therewith.

DESCRIPTION OF THE PRIOR ART

In the past, in an engine which is mounted on a boat as for example an outboard engine, it has been a common practice to insert the open end of the exhaust pipe into water in order to suppress the engine exhaust noise. However, when the arrangement is employed for a rotary piston type engine, it is possible that the negative pressure created in the working chamber of the engine during starting period thereof will cause the water level in the water immersed exhaust pipe to rise to such an extent that the water can flow into the engine working chamber. When the water thus flows into the engine, it will adversely affect the ignition property of a spark plug and thus the engine starting characteristics. Further, the water introduced into the engine will cause corrosion of the interior parts of the engine.

In order to overcome the above described disadvantages, one or more small air vent apertures may be provided in the wall of the exhaust pipe. However, if the area of the aperture, while the excessively small apertures will not be be increased due to leakage of the exhaust gas through the aperture, while the excessively small apertures will not be effective to prevent the reverse water flow. Further, it has been proposed to provide a baffle plate or a check valve in the exhaust pipe, however, these arrangements have not been satisfactory since the baffle plate or the check valve substantially increases the exhaust resistance.

SUMMARY OF THE INVENTION

The present invention is aimed to provide a reverse water flow arrester in which the above described disadvantages of the prior arrangements can be eliminated.

It is an object of the present invention to provide a reverse water flow arrester for a Wankel type rotary piston engine having an exhaust pipe with one end communicating with an exhaust working chamber of the engine and the other end inserted into the water for discharging exhaust gas thereinto, characterized in a vacuum valve for relieving negative pressure created duruing starting period within said exhaust working chamber to prevent reverse water flow through the exhaust pipe.

It is a further object of the present invention to provide a reverse water flow arrester for a rotary piston engine of the type above referred to, said arrester comprising a negative pressure relief port provided in the engine housing at a position slightly before the position where the working chamber defined by a piston or a rotor and the housing is opened to the exhaust port through rotation of the piston or rotor, the relief port being connected with a negative pressure valve whereby, when the negative pressure in the working chamber is decreased below a predetermined valve during expansion stroke, the negative pressure valve is automatically opened to allow the air into the working chamber and relieve the negative pressure therein.

It is a further object of the present invention to provide a reverse water flow arrester for an engine of the type above referred to, said arrester comprising a negative pressure valve which is capable of providing a sufficiently large opening in the wall of the exhaust pipe, said negative pressure valve being interconnected with the engine starting means so that it is opened during starting period of the engine until the engine begins normal operation by spark ignition for preventing the creation of negative pressure and the reverse water flow in the exhaust pipe.

BRIEF DESECRIPTION OF THE DRAWINGS

The drawings show the structures of rotary piston type marine engines in which exhaust gas is discharged into the water. In the drawings:

FIG. 3 is a sectional view similar to FIG. 2 but showing an embodiment of the present invention; and FIG. 4 is a side elevational view with parts broken away of a further embodiment of the present invention.

DESCRIPTION OF THE PREFERRED EMBODIMENTS

Figure 1:
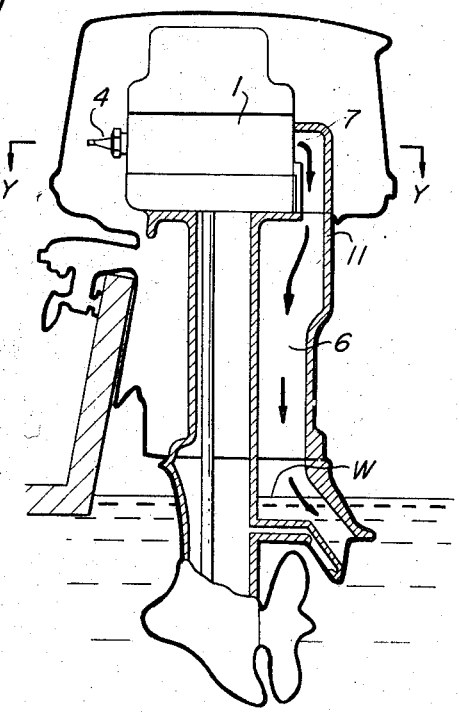
FIG. 1 is a side elevational view with parts broken away of a conventional outboard engine equipped with a rotary piston type engine.
Figure 2:
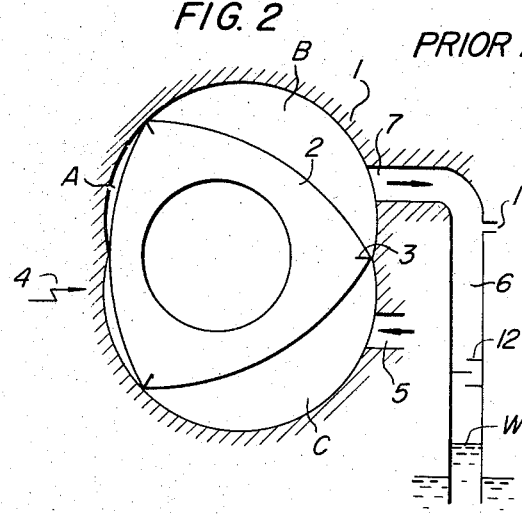
FIG. 2 is a diagrammatic sectional view taken along the line Y—Y of FIG. 1.

Referring to FIGS. 1 and 2, the reference numeral 1 shows a housing of a Wankel type rotary piston engine, 2 a rotor having an apex seal 3 and disposed so as to eccentrically rotate within said housing, 5 an intake pipe, 6 an exhaust pipe having one end connected with an exhaust port 7 and the other end inserted into the water, and 4 a spark plug. Further, the reference letters A, B, and C respectively show working chambers defined between the rotor and the housing for performing intake, combustion, expansion and exhaust strokes. In FIG. 2, the working chamber A is shown in the compression stroke, while the working chambers B and C are respectively shown in the exhaust and the intake strokes. Each of the working chambers A, B, and C is air-tightly sealed by means of apex seals 3 and side seals (not shown in the drawings). When the engine is stopped, the said three chambers respectively assume either of the intake, compression or exhaust stroke position. Among these chambers, the one which is in the compression stroke position, say the chamber A, contains mixture of fuel and air which is higher in pressure than the atmospheric pressure. However, the pressure is allowed to leak during a prolonged inoperative period of the engine through the sealed portions thereof as low as the atmospheric pressure. Moreover, the oil deposited on the housing wall and the seals gradually comes off with the result that the air-tightness at the apex and the side seals are destroyed. In such a condition, when the engine is cranked for starting, the pressure within the chamber which has been stopped during compression stroke, say the chamber A, decreases to a negative or vacuum pressure as the volume of the chamber increases, so that when the exhaust port is opened to this chamber the vacuum therein is transmitted to the exhaust pipe 6 and causes the water level W within the water immersed exhaust pipe to rise. The other chambers, such as the chamber C and etc. which are succeeding to the chamber A are also repeatedly subjected to the intake, compression and expansion strokes until the engine starts a normal operation, and during this period, since the throttle valve (not shown) of the carburetor provided in the intake pipe 5 is usually closed in order to facilitate engine start, the intake mixture is introduced into each of the chambers under a pressure which is lower than the atmospheric pressure. This negative or vacuum pressure causes, together with the aforementioned imperfect air-tightness due to the oil shortage at the seals, a pressure leakage with the result that the negative pressure within each chamber and thus within the exhaust pipe gradually increases when the chamber opens to the exhaust port after the expansion stroke. As the result, the water level W within the exhaust pipe intermittently rises. Therefore, if the engine does not rapidly come to a normal operation, the water within the exhaust pipe is taken into the engine working chambers. This will cause malfunction of the spark plug and adversely affect the starting characteristics of the engine, and at the same time promotes corrosion of the engine interior parts.

As previously described, in order to eliminate these disadvantages, it has been proposed to provide one or more small vent apertures 11 in the wall of the exhaust pipe (FIG. 2), however, in this arrangement, if the aperture 11 is excessively large, the exhaust gas will be allowed to leak through the aperture and cause the increase of the exhaust noise, while if the aperture 11 is small, it will not be effective to prevent the reverse water flow. Further, it has been proposed to provide a baffle plate 12 or a check valve (not shown) in the exhaust pipe for preventing the reverse water flow, however, this arrangement is disadvantageous and impractical in that the exhaust resistance is large and thus the engine power output is decreased.

FIGS. 3 and 4 respectively show embodiments of the present invention in which the aforementioned disadvantages are overcome.

In FIG. 3, the housing is provided with a negative pressure relief port at a position slightly before the working chamber defined by the rotor and the housing is opened to the exhaust port through the rotation of the rotor, the negative pressure relief port being connected with a negative pressure valve. In this figure, the reference numeral 18 shows a negative pressure valve body with one end connected with the negative pressure relief port 8 provided in the housing 1 and the other end opened to the atmosphere. The numeral 10 shows the negative pressure valve for interrupting the communication between the relief port and the atmosphere, and 9 shows a spring for supporting the valve body (the reference numerals 1 to 7 respectively show the parts corresponding to those shown in FIG. 2). In the illustrated engine constructed as described above, when the negative pressure in the working chamber B' which is under the compression stroke is decreased below a predetermined value, the force which urges the negative pressure communicating with the working chamber B' outwardly is correspondingly decreased with the result that the atmospheric pressure opens the negative pressure valve 10 against the action of the spring 9 to connect the working chamber B' with the atmosphere.

Thus, the pressure within the working chamber increases substantially to the atmospheric pressure, so that even when the chamber is opened to the exhaust port 7 through the rotation of the rotor, the water level W within the exhaust pipe will not be caused to rise.

Thus, the arrangement in accordance with the invention is effective to perfectly prevent the reverse flow of the water into the engine. Further, during normal operation, since the negative pressure valve 10 is urged outwardly by the pressure of combustion gases, it will not have any adverse effect on the engine operation.

The negative pressure relief port 8 may be provided in either of the center and side housings of the rotary piston type engine.

FIG. 4 shows an embodiment in which an outboard engine equipped with a Wankel type rotary piston engine is provided with a negative pressure valve which can provide a substantial opening in the wall of the exhaust pipe, the negative pressure valve being interconnected with an engine starting means so that it is kept open until the engine starts its normal operation.

In FIG. 4, the reference numeral 19 shows a negative pressure valve body having one end connected with a negative pressure relief port 20 in the exhaust pipe 6 and the other end opened to the atmosphere through an auxiliary pipe 23. The numeral 21 shows a negative pressure valve for blocking the communication between the port 20 and the atmosphere, and 22 shows a spring for supporting the valve. The numeral 13 shows a starter motor, and 15 shows a starter gear wheel provided on the engine flywheel. The numeral 14 shows a pinion for the starter motor which is adapted, during engine start, to be upwardly moved to mesh with the gear wheel 15 so as to rotationally drive the engine shaft.

The negative pressure valve 21 is arranged so that it is opened only when the pinion 14 is upwardly moved to rotate the engine shaft and connects the exhaust pipe with the atmosphere. In this embodiment constructed as described above, the exhaust pipe is opened to the atmosphere through a sufficiently large opening only when the starter motor 13 is in operation, i.e., until the engine starts a normal operaiton during the engine start, so that the pressure within the exhaust pipe can be maintained as high as the atmospheric pressure. Thus, the water level (W) in exhaust pipe is not allowed to rise and thus the reverse water flow into the engine can effectively be prevented. Further, in this arrangement, once the engine starts a normal operation, the negative pressure valve 21 is closed and the exhaust gas is discharged only into the water. Thus, the advantage of discharging the exhaust gas into water is still enjoyed and the exhaust noise is suppressed to a lowest possible level.

As a modification of the arrangement shown in FIG. 4 in which the negative pressuer valve 21 is controlled by the displacement of the pinion 14 of the starter motor 13, the negative pressure valve 21 may be opened by a solenoid means which is arranged to be energized by the starter motor current, or it may be controlled by the movement of a rope of a self-winding type rope starter.

What is claimed is:

1. A Wankel type rotary piston engine having a working chamber and an exhaust pipe which communicates with said working chamber and which is adapted to extend into a body of water for leading exhaust gases from the engine into such water, said pipe and chamber thereby forming an intercommunicating chamber and pipe assembly during periods of operation of said engine, and including a vacuum-breaking valve means communicating said assembly with atmosphere, said valve means being adapted to permit flow of atmospheric air into said assembly in order to break a vacuum therein and being arranged to prevent outflow of gases from said assembly whenever the pressure therein exceeds atmospheric pressure, and wherein said valve means opens directly into said working chamber.

2. A Wankel type rotary piston engine having a working chamber and an exhaust pipe which communicates with said working chamber and which is adapted to extend into a body of water for leading exhaust gases from the engine into such water, said pipe and chamber thereby forming an intercommunicating chamber and pipe assembly during periods of operation of said engine, and including a vacuum-breaking valve means communicating said assembly with atmosphere, said valve means being adapted to permit flow of atmospheric air into said assembly in order to break a vacuum therein and being arranged to prevent outflow of gases and from said assembly whenever the pressure therein exceeds atmospheric pressure, and including an engine starter means for rotating the piston of said engine, said valve means being correlated with said starter means whereby said valve means is actuated to connect said assembly with atmosphere continuously during the operation of said starter means.

References Cited

UNITED STATES PATENTS

| | | | |
|---|---|---|---|
| 1,038,685 | 9/1912 | Titus | 60—30X |
| 2,345,569 | 4/1944 | Flint | 60—30 |
| 2,390,527 | 12/1945 | Flint | 60—30X |
| 1,073,920 | 9/1913 | Miller | 115—17 |
| 2,024,193 | 12/1935 | Watkins | 115—17 |
| 2,082,059 | 6/1937 | Irgens | 115—17 |
| 3,045,423 | 7/1962 | Hulsebus | 115—17X |
| 3,361,124 | 1/1968 | Fend | 123—182X |

FOREIGN PATENTS

| | | | |
|---|---|---|---|
| 296,226 | 8/1928 | Great Britain | 115—17 |
| 984,807 | 3/1965 | Great Britain | 123—8GOK |

ALLAN D. HERRMANN, Primary Examiner

U.S. Cl. X.R.

115—17; 123, 182, 195; 418—61